Oct. 16, 1934.　　　　M. L. SEVERY　　　　1,977,598
METHOD OF AND MEANS FOR PERMUTING THE INTENSITY AND QUALITY OF MUSICAL TONES
Filed Jan. 4, 1933　　　6 Sheets-Sheet 1
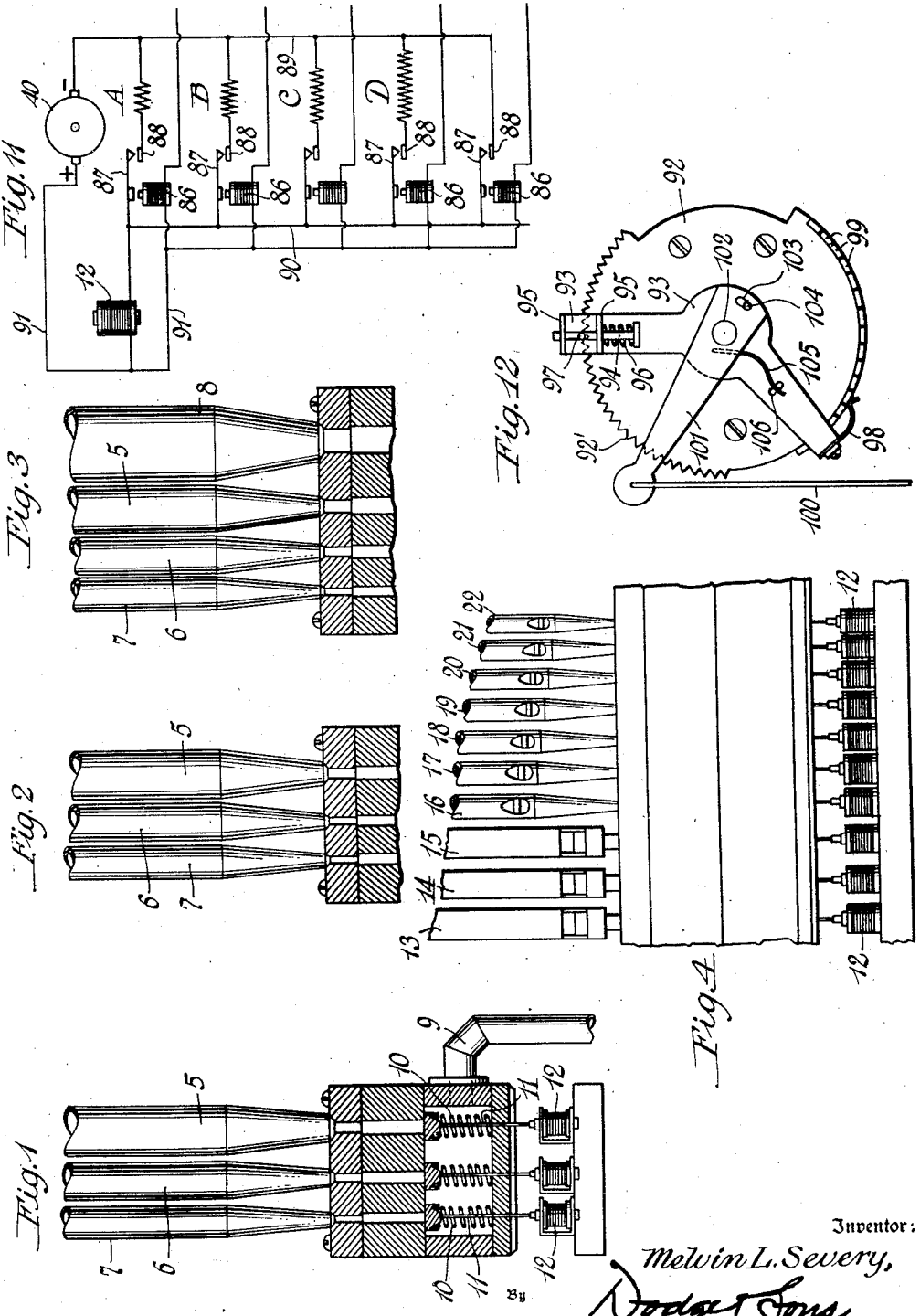
Inventor:
Melvin L. Severy,
By Dodge & Sons,
Attorneys.

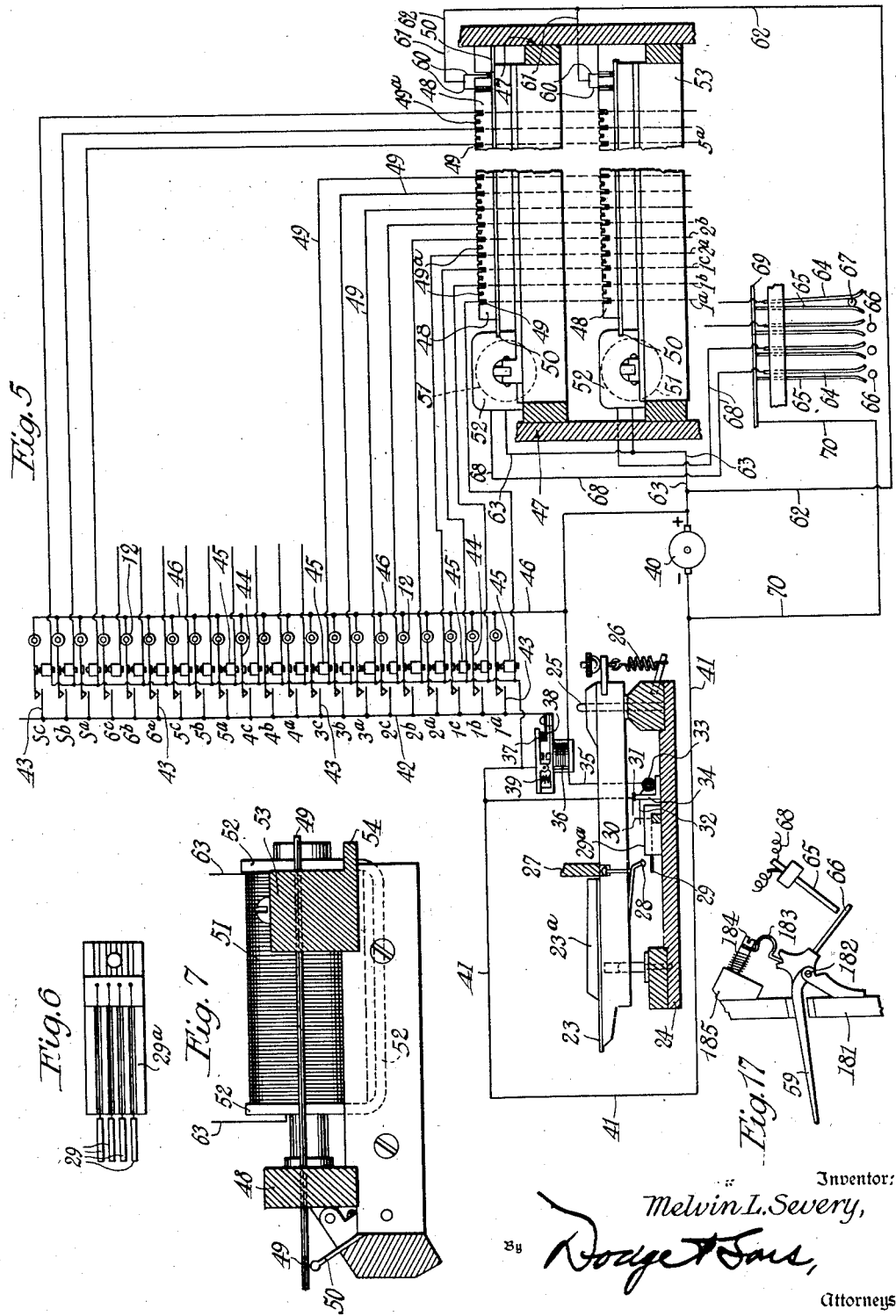

Oct. 16, 1934.  M. L. SEVERY  1,977,598
METHOD OF AND MEANS FOR PERMUTING THE INTENSITY AND QUALITY OF MUSICAL TONES
Filed Jan. 4, 1933  6 Sheets-Sheet 3
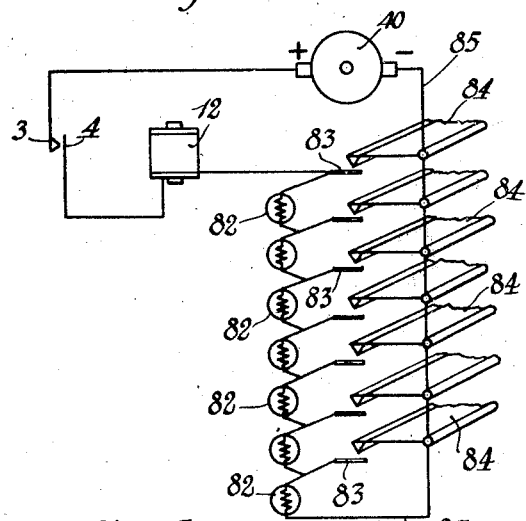
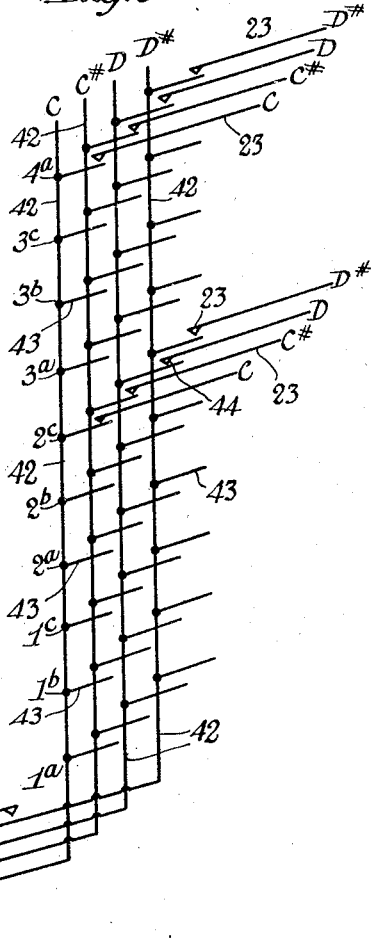
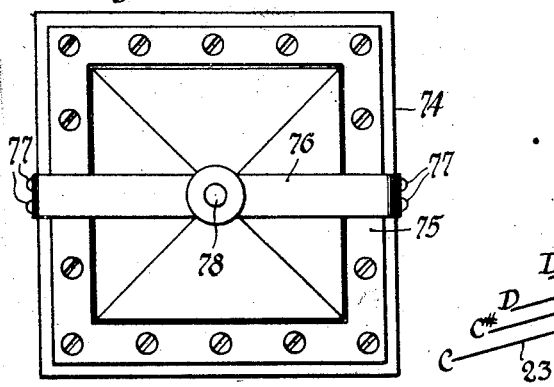
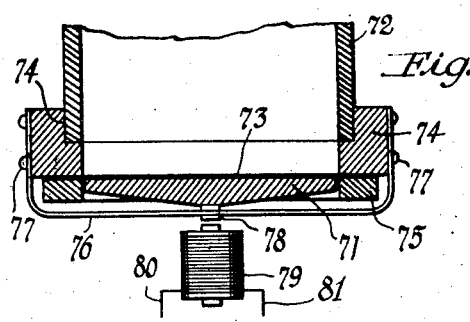
Inventor:
Melvin L. Severy,
By Dodge Sons,
Attorneys.

Oct. 16, 1934.   M. L. SEVERY   1,977,598
METHOD OF AND MEANS FOR PERMUTING THE INTENSITY AND QUALITY OF MUSICAL TONES
Filed Jan. 4, 1933   6 Sheets-Sheet 4
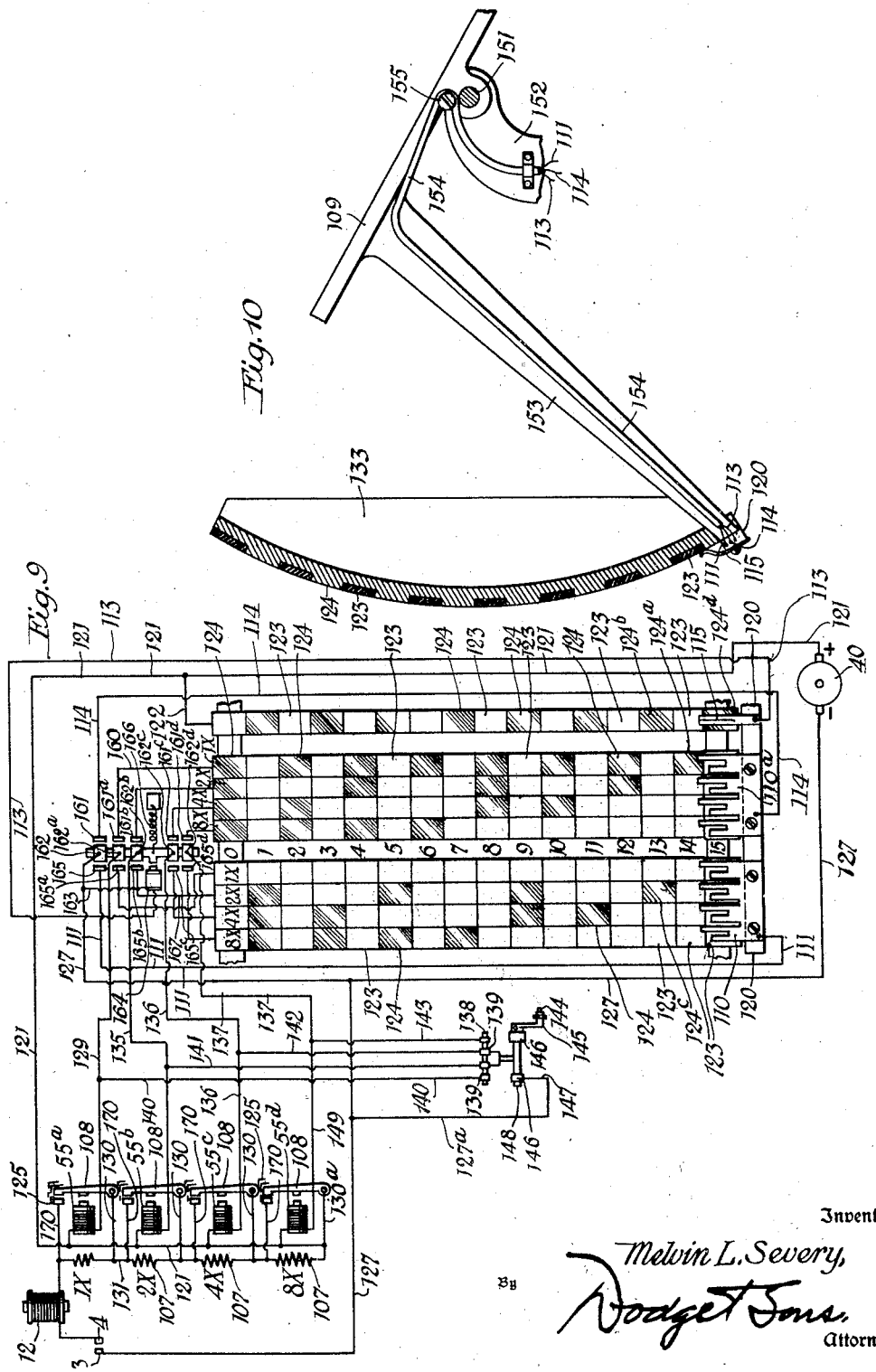
Inventor:
Melvin L. Severy,
By
Dodge Sons.
Attorneys.

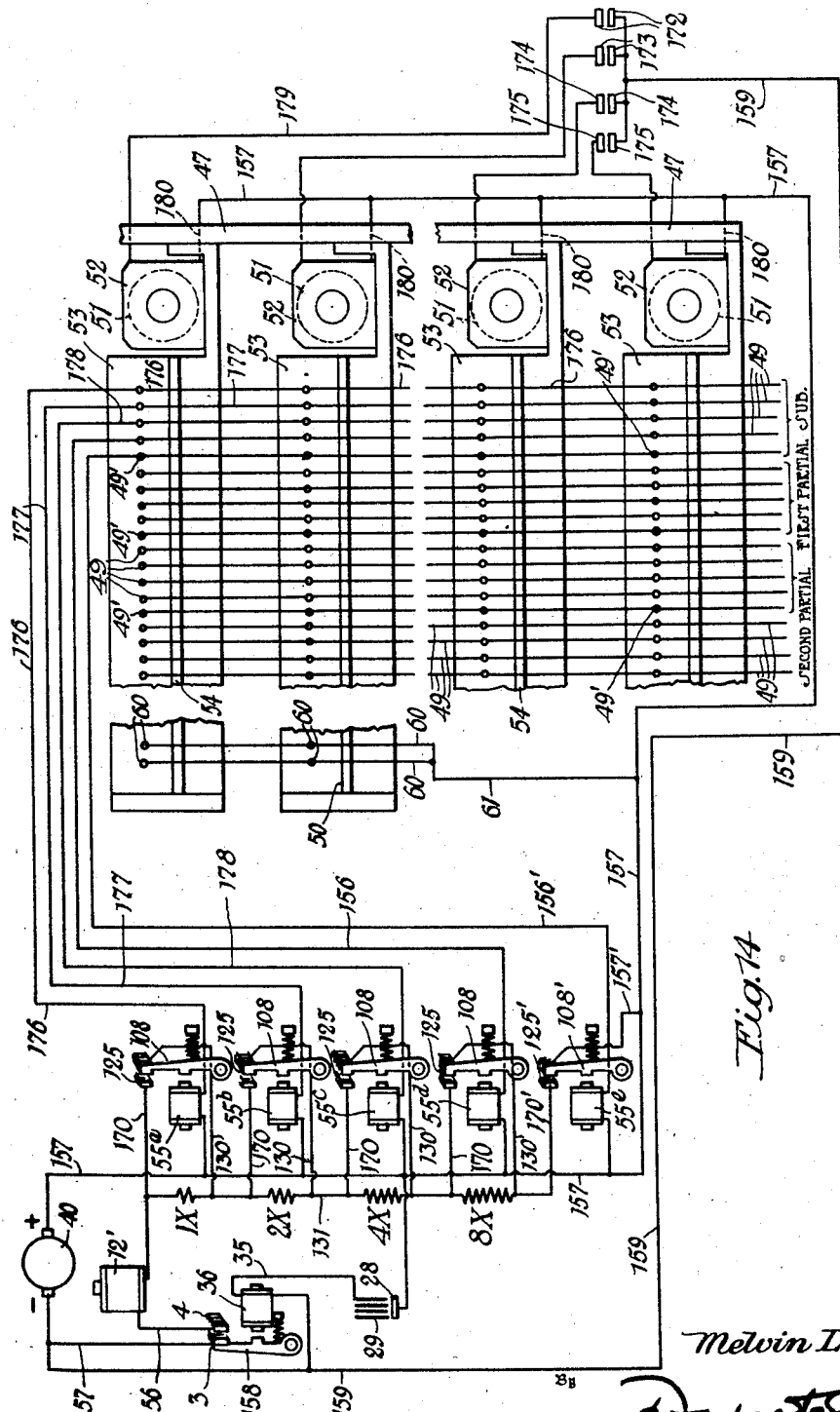

Oct. 16, 1934. M. L. SEVERY 1,977,598
METHOD OF AND MEANS FOR PERMUTING THE INTENSITY AND QUALITY OF MUSICAL TONES
Filed Jan. 4, 1933 6 Sheets-Sheet 6
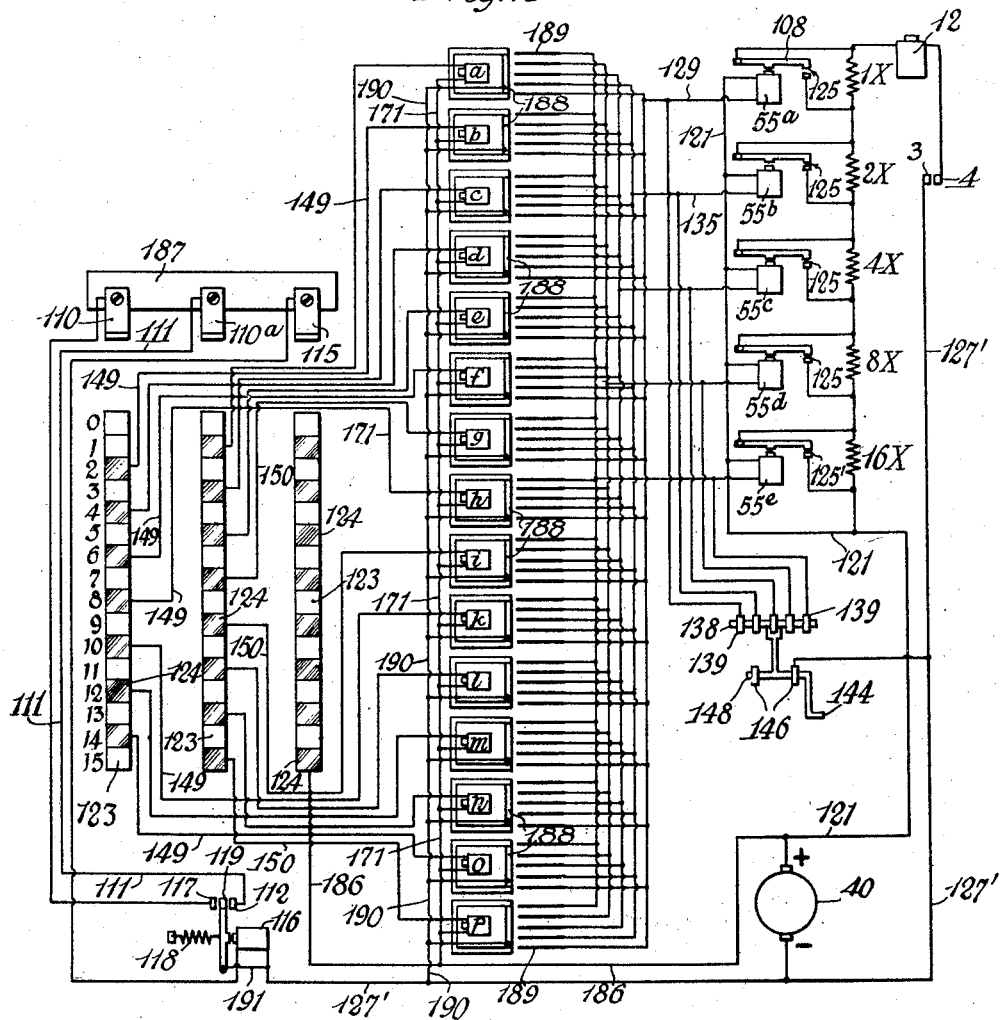
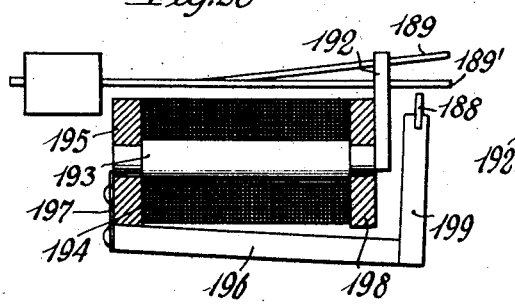
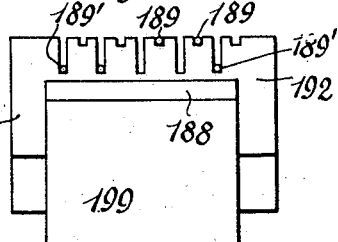
Inventor:
Melvin L. Severy,
By
Attorneys.

Patented Oct. 16, 1934

1,977,598

UNITED STATES PATENT OFFICE

1,977,598

METHOD OF AND MEANS FOR PERMUTING THE INTENSITY AND QUALITY OF MUSICAL TONES

Melvin L. Severy, Los Angeles, Calif., assignor to The Vocalsevro Company, Los Angeles, Calif., a corporation of Delaware Application January 4, 1933, Serial No. 650,179

17 Claims. (Cl. 84—331)

This invention relates more particularly to a type of musical instrument capable of producing throughout its gamut, tones of sensibly simple or sine-wave form and of the pitches of a musical scale, said simple tones, at the will of the operator, being selected, graded as to loudness or intensity, and combined to produce any desired timbre or tonal color, said tonal colors being modulated for purposes of artistic musical expression.

An important object of the invention is the provision of means which are simpler, more compact, more dependable, and cheaper than have heretofore been available, for the selection and gradation of the simple tones to be used as the partials to produce any desired complex tone or timbre.

Another important object of the invention is the provision of means which are simpler, more compact, more dependable, and cheaper than have heretofore been available, for the gradation or modulation, for purposes of artistic musical expression, of the tonal colors or timbres selected by the player.

A further important object of the invention is to increase through a permutation system, both the range and evenness of gradation with respect to each of the above-mentioned timbre-building and expression-control means.

Another important object of the invention is to make it possible to select from the full range of gradations provided, such as may be particularly desirable in a given case, omitting any which may not be wanted, so that where perfectly even increments of gradation are not wanted, they may if desired, be made unequal.

Another object of the invention is to make the value of any of the gradations adjustably alterable at will.

As this invention is applicable to tones however produced, two distinct means of tone production are illustrated, to wit, pneumatic and electrical, as sufficiently representative of any means which might be employed for this purpose. As the means of applying the invention differs when tones are produced by these two methods, both methods are shown somewhat in detail in order to make comprehension of the invention easier. In doing this I have shown some of the structures which appear more in detail in my copending application, Serial No. 472,969, filed August 4, 1930, now Patent No. 1,899,884 dated February 28, 1933.

In the drawings:

Fig. 1 is an end view of triple ranks of pipes for furnishing the third partial, showing also the wind chest, the operating magnets, and their connections;

Fig. 2 is an end view of triple ranks of pipes for furnishing the second partial;

Fig. 3 is an end view of four ranks of pipes for furnishing the first partial;

Fig. 4 is a front view of a portion of a gamut of wind-actuated pipes;

Fig. 5 is a diagrammatic view showing the invention applied to an instrument having wind-actuated sounders;

Fig. 6 is a detail view of the contact block and contact fingers of Fig. 5;

Fig. 7 is an end view of a portion of one of the set up rockers for selecting the desired partials, seen in Fig. 5;

Fig. 8 is a diagrammatic view of the keys and of the wiring, showing the wires 42 of Fig. 5;

Fig. 9 is a face view of an expression-control mechanism and its associated parts;

Fig. 10 is a side view of the same and its associated pedal-shoe;

Fig. 11 is a view illustrating a modification of a part of the mechanism shown in Fig. 9;

Fig. 12 is a detail view of the pedal-actuated mechanism associated with the modification of Fig. 11;

Fig. 13 is a diagrammatic view showing the resistance rockers and wiring;

Fig. 14 is a diagrammatic view of a partial-mixing system for electrically-actuated sounders, showing the set-up rockers of Fig. 5 from the rear;

Fig. 15 is a bottom view of a pipe adapted to produce by electrical actuation, a tone of simple or sine-wave characteristics;

Fig. 16 is a sectional view of the same;

Fig. 17 is a detail view of the tappet mechanism;

Fig. 18 is a diagrammatic view of a variant form of the preferred construction;

Fig. 19 is an end view and Fig. 20 is a side elevation of one of the relays of Fig. 18.

In Figs. 1, 2 and 3, three wind-actuated pipes 5, 6 and 7 are illustrated, which may be of the common organ type, the lower ends of these pipes opening into a wind-chest supplied by wind under pressure through the pipe 9. The lower ends of the pipes 5, 6 and 7 are fitted with spring-closed valves, which keep the wind normally out of the pipes. Valve rods 11 extend downwardly through the springs 10, said rods being connected with the cores of magnets 12. When any one of said magnets is energized by the passage of current through its coil, the associated rod 11 is pulled downward, the valve connected to it opens, the wind rushes into the bottom of the associated pipe, and the pipe speaks at the particular intensity to which it is voiced. The wind-chest, valves, rods, magnets, etc., are of course used in connection with Figs. 2 and 3 as well as with all the ranks of pipes, but have been omitted from said figures in order to simplify the showing.

In the more expensive types of instruments it may, for attainment of finer effects, be desirable to segregate the pipes of the various partials, and this is illustrated in Figs. 1, 2 and 3,—considering the fundamental as the first partial. The invention is not confined to this method, however, since in the less expensive types of wind-actuated instruments the practice adopted in several of my previous inventions where wind is not used, would generally be followed, including that described in my aforesaid U. S. Patent No. 1,899,884 where the eighty-four sounders responding to the eighty-four keys of a single manual instrument furnish not only the primes but all of the other partials needed. In the wind-actuated embodiment of the present invention there would commonly be, where fifteen degrees of loudness for each partial are provided as hereinafter explained, four rows each of eighty-four or more sounders for each manual. Fig. 3 may be taken as an end view of these four end rows.

It will be noted that the pipes 5, 6 and 7 are all of different cross-sectional area so that, for example, the areas of pipes 7, 6 and 5 shall be respectively proportional to one, two and four. The purpose is to give the pipes different intensities of utterance, and, by arranging these intensities in a broken order as, for example, proportional to one, two and four rather than as proportional to one, two and three, more extensive, gradual, tractable, and economical range of gradations is secured.

Only three ranks of pipes have been shown for each of the partials above the first, but this is merely to simplify the drawings, and any number of ranks may be used, the advantage of the system increasing with the number used for each partial. With three pipes or sounders for each pitch of each partial, seven degrees of intensity are provided, the various ranks of pipes being voiced to produce the following loudnesses: The first or left-hand rank of each group will give the first degree of loudness or intensity; the second rank will give twice the loudness of the first; the first and second ranks will give three times the loudness of the first; the third rank will give four times the loudness of the first; and first and third ranks will give five times the loudness of the first; the second and third ranks will give six times the first loudness; while the first, second and third ranks will give seven times the loudness of the first rank. In the first-partial group shown in Fig. 3 where four ranks of pipes are used, the fourth rank has a loudness eight times that of the first rank, so that the full loudness of the four ranks, taken together, at any one pitch is equal to fifteen times that of the similarly pitched pipe of the first rank.

With four sounders for each pitch of each partial, fifteen degrees of intensity may be obtained, and with five such sounders, thirty-one degrees of intensity are possible, these occurring in gradual and true gradations without loss of any gradations because some are so close to others as to constitute practical identity, as will be explained in connection with Fig. 11. If, for example, the weakest intensity be desired, the magnet 12 associated with pipe 7 is energized and that pipe speaks. If a moment later an intensity representable by five be desired, the magnets 12 associated with pipes 7 and 5 are both energized and these pipes speak at the one pitch but with a combined intensity which is five times as great as that just previously used.

It will be noted that the first partial or fundamental has four ranks of pipes (see Fig. 3), the pipe 8 having a cross-sectional area somewhat greater than the combined similar areas of the other three pipes 5, 6 and 7. This is because the rank of largest pipes has to do duty for the fundamentals or first partials, which are commonly of very much greater intensity than any of the higher partials associated therewith. There are, however, timbres where the first partial may be weak or even absent, and in such case the other three ranks are used to give any desired strength of the prime, fundamental or first partial.

Fig. 4 shows a more or less conventional arrangement of a rank of wind-actuated pipes, seen in front elevation, each with its valve-actuating magnet 12 below it. Three of these pipes, 13, 14 and 15 are shown as of rectangular section, while the remaining pipes 16, 17, 18, 19, 20, 21 and 22 are shown circular in section, but it is to be understood that they may be of any convenient section, shape and construction.

The quality of a tone depends upon the partials of which it is composed and their relative degrees of intensity, so that by choosing any partials desired, and combining them in any desired degree of intensity, all manner of tonal timbres may be produced, always provided the partials themselves are simple and not complex tones. Where wind-actuated pipes are used for the simple tones, it is desirable that they should be as nearly simple as possible, for while it is relatively easy to produce sensibly simple sine-wave or fundamental tones by the electrical method here disclosed, it requires much more care to stop out the upper partials from organ pipes when actuated in the usual way by wind. While this may perhaps not be done with the same degree of perfection as when the electrical method is used, it is possible to come sufficiently near it to enable the construction, along organ lines, of a very beautiful and serviceable instrument.

Referring now to Fig. 5, the numeral 23 indicates one of the keys of a manual; 24 the key-bed; 25 the rear supporting pins of the keys; 26 the spring for keeping the keys normally raised; 27 the stop-rail; 28 the preferably silver-shod short-circuiting or contacting bar for contacting with the silver-ended tongues 29 which are fastened in a grooved block 29ª as seen in Fig. 6. The upwardly bent end of one of these tongues is indicated at 30, Fig. 5. The feed or return strip 31, wire 32 from the cable 33 passing through the wiring strip 34 and joined to the upwardly bent wire 30, are described more in detail in my co-pending application Serial No. 472,969. A wire 35 is associated with and given current by the depression of key 23, the depression of said key energizing the relay magnet 36 and thus bringing contacts 37, 38 together against the pull of spring 39. Current is thus supplied from a source 40 by way of wire 41 and contacts 37, 38 to a wire 42 associated with key 23 of the manual, which for the sake of definiteness will be designated C of 32.33 vibrations per second. A relay magnet 36 is associated with each key of the manual, and one of the chief functions of said relay is to take the mechanical and electrical burden off the key, making it possible to use a very small amount of current and very delicate mechanism in immediate connection with the keys. The wire or line 42 is shown again in Fig. 8 in part, but the relay is omitted as unnecessary in a figure intended chiefly to show that there is a series of wires 42, one for each key of the manual.

It will be noted that in Fig. 5 branch wires 43 lead from the line 42, and that their rightward ends are adapted to be contacted by switches 44 actuated by magnets 45, so that when a magnet 45 is energized, pulling down its associated contact 44 into touch with a contact upon wire 43, current flows through an associated magnet 12. These magnets, as seen in Figs. 1 and 4, are the magnets which operate the valves of the wind-operated pipes or sounders. The circuit used to attain the result just stated is as follows: From the source 40 current flows by way of wire 41 to relay contact 37; thence, since the relay magnet 36 is energized, across to relay contact 38 and to wire 42; thence to wire 43 and, since a magnet 45 is energized in a manner which will be explained later, a switch 44 is closed upon contact thereof with wire 43; thence to one pole of a magnet 12; from the other pole of said magnet to a common return or feed wire 46; and back to the plus pole of source 40, thus completing the circuit.

The manner in which the magnets 45 are energized will now be described. Between cheeks 47 are mounted two of a series of so-called set-up rockers, one of which is shown in end view in Fig. 7, a diagrammatic rear view of four of said rockers being shown in Fig. 14. The action of the rocker will be best understood from Fig. 7. In this figure, a comb or dentated strip 48 of maple or other suitable material is provided with alternate deep and shallow teeth for the nesting of conducting wires or spring tongues 49, the deeper grooves or teeth being for the wires when in operative position, and the shallower grooves being used as a means of retaining the wires in an inoperative position and out of reach of the short-circuiting member 50 (Figs. 5 and 7), when it rises into contact with all the wires lying in the deeper slots upon the energization of the associated solenoidal magnet 51. The bobbin of magnet 51 is mounted between the ends 52 of a rectangularly bent member of iron, as shown in Fig. 7, and in end view in Figs. 5 and 14. The wires 49, the front ends of which are seen in Fig. 5, are shown as projecting through the non-conducting bar 53, in which they are firmly fixed at their rear ends. A longitudinally-extending projection 54 is formed from or attached to the member holding the wires 49, and serves as a wiring strip through which the parallel vertical wires 176, 177, 178, 156 may be passed, see Fig. 14. The conducting wires or spring tongues 49 are, in practice, conducting phosphor bronze, round spring wires used as tongues which are elastically returnable when pressed out of normal position.

As best seen in Fig. 5, the vertical conductor 42 has opposite its branches 43, reading upwardly from the bottom, the notations $1^a$, $1^b$, $1^c$; $2^a$, $2^b$, $2^c$; $3^a$, $3^b$, $3^c$; $4^a$, $4^b$, $4^c$; $5^a$, $5^b$, $5^c$; $6^a$, $6^b$, $6^c$; $S^a$, $S^b$, $S^c$. The numerals prefixing the letters serve to designate the partial under consideration, while the letter following the numeral serves to indicate the strength of the tone called forth by the operation of its associated switch. In the case of $S^a$, $S^b$, and $S^c$, the letter "S" refers to the "sub" or octave below the fundamental, and the small letters have the same significance as before. For example, $S^a$ indicates that the tone is to have for one of its components a "sub" at the weakest strength, while $4^a$, $4^b$, $4^c$ indicate that a fourth partial, at its strongest strength will be produced, the pipes 5, 6 and 7 speaking together. As will readily be seen by referring to Fig. 5, the partials used, and the strength thereof, depend entirely upon which magnets 45 are energized, and this in turn depends entirely upon which of the wires 49 are in their deepest slots when the magnet 51 causes the short-circuiting or common bar 50 to rise when its associated tappet 59 is operated at the console (Fig. 17). It is understood, of course, that each set-up rocker has, and is operated by, its individual tappet or switch, preferably located at the console. In Fig. 5, the set-up rockers are shown as broken away, and all of the wires 49, therefore, do not appear. This, however, is immaterial, since it will be evident that there will be a wire 49 for each of the intensities of each of the partials or tonal components used, besides two extra wires 60 joined to a wire 61 connected to a wire 62 leading to a wire 63 and thence to the source of current 40. The wires 60 thus serve to connect the short-circuiting bar 50 to the current source without permanently attaching any wire to this moving member, such practice being objectionable for obvious reasons.

In order to avoid complication of the drawings, only seven tonal components have been shown in Fig. 5, to wit, six partials and a "sub", each having a plurality of degrees of intensity. It is obvious, however, that any desirable number of partials may be used, and even in ordinary cases more would commonly be used, but the number used in no way alters the principles of the invention. It is also to be observed that while three intensity gradations are shown in Fig. 5 and indicated by the exponents "a", "b", "c", these gradations are supposed to indicate the intensities which, by my invention, are made to permute into each other, or to combine in a way to give actually seven degrees of tonal intensity as heretofore stated. Fig. 9, as will later be explained, shows the manner in which four combining intensities, represented by resistances, are used to develop fifteen gradations in addition to full intensity, and illustrates how the addition of a single intensity greatly augments the number of gradations possible.

The conventional tappet-switch fingers 64, 65 seen in Fig. 5 are bridged in action by the insertion between them of bridging pins 66 or 67 actuated by the tappets 59, the pin 67 being in position to complete the circuit to its associated set-up rocker magnet 51. This tappet mechanism is well-known in the art, but for the sake of clearness of showing a single tappet and its associated parts are illustrated in Fig. 17. If the tappet associated with the left-most bridging pin 66 of Fig. 5 be depressed, thus causing the said pin to be thrust between its co-acting members 64, 65, the upper of the two set-up rockers illustrated will be actuated. The circuit would then be as follows: From the positive pole of the source 40 by the wire 63 to one pole of magnet 51 operating the upper of the two set-up rockers shown; then through the coil of said magnet and from its other pole by wire 68 to the associated contact finger 64; thence by bridging pin 66, which would be raised, to the co-acting contact finger 65; thence to the common return 69 and via wires 70 and 41 back to the negative pole of source 40.

This completes the circuit and causes the bridging bar 50 to rise and pick up all the wires 49 which are nested in the lower slots of their associated comb, as previously described. As the rear ends of these wires 49 are each connected to a magnet 45 adapted, when energized, to close an associated pair of contacts 43, 44, an associated magnet 12 is thereby energized, and causes an associated pipe or sounder to speak. It will thus be evident that the selection, within the scope of the instrument as built, of any partials at any intensities, and therefore of any tone color, is a mere matter of raising or lowering the wires 49 of the set-up rockers, as previously stated. When these wires have been so adapted, either in the instrument when built, or by the player, to produce some particular tonal effect, then the mere pressure of the tappet associated with that rocker will call forth that quality of tone upon the pressure of any key of the manual. If, after playing a selection, a player desired to change the timbre associated with any particular tappet, he need only properly alter the positions of the wires 49, 49ª in the comb associated with that particular tappet, in order to produce any desired tonal quality throughout the entire timbre range of the instrument. In Fig. 5 the wires 49 are all in active position, while the wires 49ª have been raised into an inoperative position. To avoid confusion only the wires in operative position are shown carried through to the speaking magnets. The mechanical action of the solenoidal magnet 51 operating these set-up rockers is so clearly set forth and explained in my aforesaid companion application Serial No. 472,969, that further explanation of it herein is deemed unnecessary, and the same may be said of the key action shown in Fig. 5 and the details shown in Figs. 6 and 7.

Fig. 8 shows in perspective diagram, four manual keys 23, representing the notes C, C#, D and D#, but omitting the relay mechanism associated with each key, which mechanism is shown in connection with the key 23 of Fig. 5, said Fig. 8 chiefly showing the parallel arrangement of the vertical conductors 42, one of which is associated with each key 23 of the manual. The other details of this mechanism are illustrated in Fig. 5.

The expression-control for the wind-actuated sounders illustrated in Figs. 1 to 4 is the well-known organ swell-box or shutter mechanism of the conventional type shown in Figs. 8 and 9 of Patent No. 1,733,630 granted to me October 29, 1929. Accordingly, and because this method of modulating wind-actuated sounders for purposes of artistic expression is so very well known, detailed description and illustration thereof has been omitted. It should be understood, however, that I do not confine myself to any particular kind of expression control, since any means whatsoever of securing from wind-operated sounders the intensity gradations necessary for artistic expression would come well within the scope of my invention.

It is well known that organ pipes of the wind-actuated type are, especially when of low pitch, slow of speech, and it is also common knowledge that such wind-actuated sounders do not lend themselves readily to the production of strictly fundamental or sine-wave tones. As such pipes receive, when blown, every manner of pitch or flutter, they are prone to sound not only the prime to which they are tuned, but any other flutter to which they may respond, thus giving more or less complex tones despite whatever care may be expended upon them. The most that may be done is to free them from upper partials to an extent which makes possible in the methods herein set forth, a wide range of beautiful tonal qualities, and an instrument of far greater musical resources than is available with the conventional organ methods. It is also well known that a smothered loud tone is not a soft tone, and that the action of the swell shutters of an organ has a stifling effect modifying the tonal timbre. This, however, is so usual that it is not thought disagreeable and, when something free from it is heard, the listener will probably notice the superior clarity and beauty of the tones without knowing to what to attribute it. It follows, therefore, that wind-actuated sounders are capable, even with certain short-comings, of excellent musical service, and there are conditions where they may be used to great advantage.

For the attainment of the highest possible perfection I prefer, however, where conditions permit, to use sounders which are not wind-actuated. A most convenient type of such a sounder is that operated through the rhythmic variation of an electrical field. In my co-pending application, Serial No. 472,969 I illustrate one type of means for producing these correctly-timed rhythmic pulsations, while in my co-pending application Serial No. 455,876 filed May 26, 1930, I show a commutator-means for producing this result as illustrated in connection with Fig. 15 hereof. This figure and Fig. 16 illustrate certain advantages of non-wind sounders, showing how these advantages are secured. 71 indicates a plunger or "diaphragm", shown as rectangular, which is commonly formed or ribbed to prevent its breaking up into harmonic vibrations during its actuation. This diaphragm or plunger is freely movable, but is held in position in the end of pipe or resonator 72 by a membrane 73 of bellows-cloth, leather, or any other suitable material secured to the pipe at its end or any other suitable point, around the outer edges of said material by a frame 74 screwed or otherwise suitably fastened to the member 75. In Fig. 16 the frame 74 is shown screwed to the member 75. The plunger-diaphragm 71 is flexibly supported upon the spring member 76, the ends of which are given a quarter turn to produce right angle extensions which are fastened to the member 74 by screws 77. At the center of the plunger-diaphragm, where it is supported by the spring member 76, an armature 78 is secured to the spring and thus to the diaphragm, said armature opposing the head of an electro-magnet 79 whose leads 80 and 81, as before stated, carry a correctly-timed pulsatory energizing current from commutator or equivalent mechanism, not shown.

Several important advantages of this method will be readily appreciated upon mere mention. First, the resonator does not make its own tone, as in the case of wind-actuated pipes, for which reason nothing like accuracy of tuning, in the organ sense, is necessary with regard to the resonator and, for cognate reasons, it does not get out of pitch because of temperature or other changes. Second, only the one periodicity of vibration is given to the plunger, and, since this is so constructed that it cannot itself break up into other vibrations, only one pulse is given to the resonator or pipe which, accordingly, tends to speak to a pure fundamental or simple tone. Third, the pipe not having to select its correct pulsation from a heterogeneous mass of flutters, and then to build it up, is of much quicker and clearer speech. Fourth, the intensity of the tone may be easily controlled for artistic musical expression as well as for other purposes, without smothering or altering its quality in the least. It will be seen, therefore, that where conditions make it feasible to use this non-wind method of tone-production, the very finest possible musical results will be attainable.

It will be noted that the same permutative system, translated into electrical terms, is used for the electrically actuated sounders as is used in the case of the wind-actuated sounders already described, a fact which will be made clearer as the description proceeds.

Fig. 13 illustrates a type of expression-control used upon certain occasions, which is essentially that shown and described in said application Serial No. 472,969. It is shown here in order to make clear the distinction between that method and the one set forth in this present application. In Fig. 13, 3, 4, indicate coacting fundamental contacts of the multi-pointed relay 36 of Fig. 5 associated with the speaking magnet 12 (however actuated), the source of current 40 being also seen. The resistances 82 are shown in vertical rows, and in this method are preferably of like value, for since the action of the device is, according to the direction of the movement of the pedal-shoe, either purely additive or subtractive, any appreciable variation in the amounts of successive resistances called into play would make for an inartistic unevenness in the musical expression resulting from the pedal action. Tracing the circuit it will be noted that current flows from the source 40 to the co-acting contacts 3, 4, thence to magnet 12, and thence to the upper contact point 83. If now, all the expression rockers 84 are open as shown, the current must pass down through all the resistances 82 by wire 85 back to the source. This completes the circuit, in which will necessarily be included all of the resistances 82, so that the magnet 12 will speak with its minimum intensity. If, now, the upper rocker 84 is depressed into co-action with contact 83, the current will pass from magnet 12 directly back to the source 40 without the interposition of any resistance 82, and said magnet will respond with its maximum loudness or intensity. In this system all of the resistances below any closed rocker 84 are cut out of the circuit.

Turning now to Fig. 11, a speaking magnet 12, however operated or operating, is again indicated together with switch-operating magnets 86 of familiar function, and a source of current 40. The four resistances A, B, C, D, which are shown in this figure are arranged to give, respectively, beginning with resistance A, 60 units, 140 units, 190 units, and 240 units. I have used the terms "60 units", "140 units", etc., as a convenient way of expressing values, but it is to be understood to mean when I say "60 units", that ohmic resistance, whatever it may be, which will be required to produce sixty increments of loudness at the speaking unit. Throughout this specification it is to be understood that it is increments and decrements of volume or loudness which it is desired to produce, the resistances, or other means such as those illustrated in Figs. 1, 2, 3, 4, etc., merely indicating a way of producing this result. These resistances may of course be changed somewhat so as to produce different relative increments and decrements of loudness, but it is believed that, for the use for which they are intended, they can not be greatly improved, and they are set down here to illustrate some of the difficulties and limitations of this system, so that the preferred method may be the better understood. When a magnet 86 is actuated, its associated rocker 87 is brought into touch with its co-acting member 88, thus causing current to flow from source 40 via the wire 89 through the resistance associated with the contact 88 which happens to be closed, and thence to line 90 and to one pole of the speaking magnet 12. The other pole of this magnet is joined to a wire 91 which, leading back to the source, completes the circuit, causing the speaking magnet to act with a power diminished by the amount of resistance inserted into the line. If, however, several of these resistances are inserted at the same time, their multiple effect will be a resistance lower than any one of them, and it will be obvious that none, any portion, or all of said resistances may be inserted at the same time. The results of this multiple use, as well as the difficulty of getting satisfactory gradations will be obvious when it is understood that gradations between the ohmic values of the resistances are not even, and that some combinations are so near other combinations as to be of no value, thus cutting down the number of effective steps. The possible combinations with the four resistances are as follows:—

```
A    A B    A B C
B    A C    A B D
C    A D    A C D
D    B C    B C D = 60.4
     B D    A B C D
     C D
```

The ohmic values of these combinations are as follows:—

```
ABCD = 30
ABC  = 34.4+
ABD  = 35.7+
ACD  = 38.3
AB   = 42
AC   = 45.6
A    = 60
BCD  = 60.4
AD   = 72
BC   = 80.6
BD   = 88.4
CD   = 106
B    = 140
C    = 190
D    = 240
```

As an example of the difficulty mentioned, it will be noted that A gives 60 ohms, while the combination BCD gives 60.4 ohms, a step which is entirely useless. Again, the combination BD gives 88.4 ohms, the next best step obtainable being CD at 106 ohms, a difference of 17.6 ohms, whereas the preceding step shows a variation of less than half that amount, and the following step shows a variation of 34 ohms. These variations would be tolerable if nothing better were obtainable, but they are certainly not ideally smooth.

In Fig. 12 the stationary disk-like member 92 carries V-shaped teeth 92' on a part of its periphery, and conducting and non-conducting sections on an opposite part thereof. The toothed section is adapted to be traversed by an arm 93 carrying a bolt 94 upwardly slidable in ways 95 against a spring 96, the bolt carrying a small roller 97 for engagement between the teeth 92'. This construction prevents arm 93 stopping in such a position that the brush 98 would be on an insulating section between two of the conducting sections 99 of disk 92. A rod 100 is operated by a pedal, pedal-shoe, or otherwise, for purposes of musical expression, and its function is to cause the conducting brush 98 to pass successively over the sections 99 of the commutator without stopping upon the insulation separating such sections. The expedient of making a commutator brush with a plurality of fingers of different lengths, so as to bridge the insulating gap between commutator sections, is not available here, as will be seen as the description proceeds. An arm 101 is pivoted at 102 upon the movable member 93, and is provided with a slot 103 into which projects a pin 104 fast in said arm 93, so that when the pedal rod 100 is pulled down, this slot and pin take the position shown in the drawings, against the action of the tongue spring 105, the outer end of which is movable between the pins 106 and the inner end of which is fast in the member 101. If now the rod 100 be still further pulled down, the arm 93 will be moved anti-clockwise, its associated bolt 94 and roller 97 rising to let the roller pass over the crest of each V-tooth in its line of traverse. Should, however, the position of pedal rod 100 be such as would bring roller 97 nearly upon the point of a V-tooth, it will not stay there, but will slip into the next notch under the action of the spring 96, the necessary movement being permitted by the slot 103. The action is similar to the line-spacing mechanism of a typewriter.

The device of Fig. 12 functions in connection with the mechanism of Fig. 11, and the stationary commutator sections 99 are preferably in four rows, only one row being seen in Fig. 12. Each of said rows actuates one of the four magnets 86 associated with the resistances A, B, C, D of Fig. 11, and their function will be described in connection with Fig. 9. The registration of some of the parts shown in Figs. 11 and 12 has to be quite accurate, and it is difficult, if not impossible, to avoid the riding of the roller 97 over the teeth 92' being felt as a roughness by the player.

In an expression control system for a musical instrument, it is, of course, most desirable that the increments and decrements of tonal volume should be as gradual and smooth as possible,— at least gradual to such an extent that the ear will not detect sudden and abrupt variations in the tonal volume. To accomplish this result in a powerful musical instrument requires a very considerable number of gradations, and when these are secured by the method shown in Fig. 13, for purposes of comparison, the large number of rockers required entails a very considerable expense which it is one of the purposes of this present invention greatly to reduce.

Where the permuting system here disclosed is used for the grading of partials, the evenness of the gradations is not so vital a matter. Indeed, in some instances, the steps may be intentionally made abrupt in certain sections of the gradational range, for it will frequently be found that a certain partial is more serviceable in certain of the possible loudnesses than in others, wherefore these loudnesses will be favored and the others correspondingly slighted. In order easily to illustrate the permuting system of this application, it has been found necessary to adopt some arbitrary ratios of increments, and, accordingly, 1X, 2X, 4X, 8X and 16X have been used, because they produce increments corresponding to the ordinal numbers 1, 2, 3, etc. It is to be understood, however, that this is merely for illustrative purposes, since there are many cases where these ratios would not be ideal by any means. Furthermore, wherever 1X, 2X, 4X, etc. are herein referred to as resistances, it should be understood that they mean such resistances as will produce tonal volumes in the ratio of 1, 2, 3, etc.,—in short, that the numeral is used to indicate the volume and the "X" to indicate the indeterminate resistance necessary to produce it. The ideal gradations for an expression control of any particular portion of the scale of a musical instrument might be determined somewhat as follows. Assume, for convenience of illustration, that ten resistance steps or gradations are to be used. If the speaking magnet, such as 12, has, for instance, eight ohms resistance, and one hundred and twenty ohms added to its line would subdue the volume of the note sounded through said magnet to the lowest point ever required, then under these circumstances, gradations ideal—or sufficiently near ideal—would be arrived at by multiplying the volume of the softest gradation by the tenth root of one hundred and twenty to obtain the volume of the next softest gradation, and then multiplying that product by the tenth root of one hundred and twenty for the next step, and so on through the ten steps, the last step of which should then be sufficiently near to the full volume produced by the action of the speaking magnet without any additional resistance in its line, to show no prejudicial abruptness when passing from the one to the other. Under these practically ideal conditions, the ratios of the various volumes should run very nearly parallel to the ratios subsisting between the various resistances used to produce them.

As already pointed out, these conditions of ideal smoothness are not always desirable, and when so desirable they cannot practically be attained with exactness without prohibitive expense. For this reason, in types of instruments in which the cost is not prohibitive, a surplusage of possible permutations is provided from which may be selected those values which produce the most desirable results, as clearly set forth herein. As the essence of this invention is the attainment of a large number of variations with a relatively small number of members, I do not confine myself to particular values or ratios between said variations since these may be in each case determined by the conditions under which the invention is being used, nor do I confine myself to any particular way of producing these variations.

An improved type of expression-control mechanism is illustrated in Fig. 9, this construction avoiding the difficulties heretofore mentioned. As shown, it is applicable to the electrically actuated or non-wind type of sounder, but I consider that my invention covers any field where its peculiar advantages may be availed of, and do not, therefore, restrict myself to this one application of it. A "speaking magnet", so-called to distinguish it from a magnet of the "operating system", is indicated at 12, co-acting fundamental contacts 3, 4 of the multi-pointed relay being associated with said magnet. Rocker-controlling magnets of the type described in connection with Fig. 7 are indicated at 55ª, 55ᵇ, 55ᶜ, 55ᵈ. The resistances 107 are preferably of ohmic resistances proportional to one, two, four and eight, as indicated on the drawings. Each of the magnets 55 co-acts with a rocking member 108 to close all of the lines of its associated resistances, so that when a magnet 55, as for example, magnet 55ᶜ, closes its co-acting switch, every resistance 107 in the whole horizontal tier of resistances associated with the rocker operated by magnet 55ᶜ will be shunted out, and the resistances in the lines of the speaking magnets 12 will be decreased by just that much. It must be borne constantly in mind that the resistances 107 necessary to produce the volume indicated by 1X, 2X, 4X and 8X each represent the end of a horizontal tier of resistances which will vary in amount at different portions of such tier. The reason for this is merely that a resistance which would be sufficient to reduce the volume of a bass note by half will not do the same for a treble note. In order to keep the scale in proper musical proportion, that is, keep it correctly voiced during all modulations for artistic expression, it is, therefore, necessary to grade the resistances with care from the bass to the treble. Furthermore, it must be understood that it is preferable that these gradations be so made that the ratios between corresponding notes of any two tiers shall be the same. This, as shown in the drawings, would mean that the volume resulting from the insertion of a resistance in the second tier operated through magnet 55ᵇ should be approximately one-half as great as the volume associated with the same note in the tier above it operated through magnet 55ᵃ, while any resistance in the fourth tier operated through magnet 55ᵈ should be of a value to produce a volume approximately one-eighth as great as that produced by the resistance associated with the same note in the first tier operated by magnet 55ᵃ.

The right-hand portion of Fig. 9 represents pedal segments over which brushes travel under the action of a pedal-shoe, one of which is shown at 109 in Fig. 10. It will be noted that these segments comprise two groups of four vertical rows of conducting and non-conducting sections, and one group of one vertical row, and that each row of these conducting and non-conducting sections is traversed, under the action of pedal-shoe 109, by a brush 110, 110ᵃ or 115, or the tongue of such brush, though the vertical row 1X in the left-hand segment is electrically inert, opposing only insulation to its brush, and is shown for the sake of symmetry merely. The three vertical groups of non-conducting sections 123 and conducting sections 124 are for the purpose of properly actuating the magnets 55ᵃ, 55ᵇ, 55ᶜ, and 55ᵈ. To accomplish this result the brush 115 is used, as will be later described, to cause an alternate shifting of the current now into one and now into the other of the multi-fingered brushes 110, 110ᵃ, as they traverse their associated conducting and non-conducting sections with the movement of the bar 120 by which all said brushes are carried and with which they move. The conducting sections 124 comprise raised portions of continuous vertical metallic strips with insulation between said raised portions constituting the non-conducting sections 123, all of said metallic strips being insulated from one another. It will also be noted that these conducting and non-conducting sections are, for the sake of simplicity, all shown of the same length although in practice there would commonly be variations between them. The segments traversed by the brushes may be made in any convenient way and I do not limit myself to the particular way shown in the drawings.

In Fig. 9 wherever a conducting section 124 appears in the single vertical strip traversed by brush 115, the corresponding horizontal row of the segment traversed by brush 110ᵃ, will invariably be devoid of any conducting sections on such horizontal line. Contrariwise, a non-conducting section 123 of the single strip will always have on the same horizontal line with it one or more conducting sections 124 in the segment nearest it bearing the four vertical strips. The purpose of this arrangement is to shift the current alternately from brush 110 to brush 110ᵃ and vice versa, in exact accordance with the position of brush 115. The additional means by which this is accomplished is the multi-pointed, double-throw switch seen in its mid or transitory position at the top of Fig. 9, its leftward throw being caused by the energization of electromagnet 164 while its rightward movement takes place through the agency of spring 166 whenever magnet 164 is de-energized. When said switch is midway of its transition as shown in the drawings, all current is, for a fraction of a second, cut off from both brushes 110 and 110ᵃ. It will be seen that the movable member of the double-throw switch is about to bring its contacting sections 162, 162ᵃ, 162ᵇ, 162ᶜ, 162ᵈ, into contact respectively with stationary contacts 161, 161ᵃ, 161ᵇ, 161ᶜ 161ᵈ, and when this occurs negative current will flow from the generator 40 by wire 127 to contact 162 on the rocking member which then will be pressed against its co-acting contact 161, whence current will flow by wire 114 to the multi-fingered brush 110ᵃ, so that any conducting section 124 in the vertical rows of the segment upon which a finger of said brush rests, will be given current. In Fig. 9 the right-most finger of brush 110ᵃ is on the lowermost conducting section 124ᵃ of the vertical strip designated 1X at its top, so that current flows from brush 110ᵃ into this strip and from the upper end thereof by the wire 160 to the stationary contact 161ᵃ; thence to the co-acting contact 162ᵃ pressed against it and from said contact by wire 129 to magnet 55ᵃ; thence from the other pole of said magnet to a wire 121 leading back to the plus pole of generator 40. This completes the circuit and energizes magnet 55ᵃ so that its co-acting armature or rocking member 108, which carries a multiplicity of contacts, will be moved leftwardly into touch with the opposed electrically independent contacts 125 each one of which is associated, and co-acts, with one of the contacts of rocker 108. It will be understood that the speaking magnet 12 represents but one of a plurality of magnets used in the instrument,—commonly eighty-four per manual for a seven-octave instrument.

The function of th's expression-control mechanism being to determine the loudness of the tones elicited by the speaking magnets 12, the circuit which produces the results obtained by the energization of the magnet 55ᵃ of Fig. 9 will now be traced. When the contacts carried by rocker 108 are brought into touch with their associated contacts 125, current flows from the positive pole of generator 40 by the wire 121 to wire 130ᵃ; thence through the resistances 8X, 4X and 2X and to a contact of the upper rocking member 108 which is now in touch with its co-acting contact 125. Current is thus permitted to pass to magnet 12 without going through resistance 1X, thereby giving to said magnet a power one gradation greater than its minimum and causing its associated sounder to speak with a loudness one gradation greater than its minimum. From the other pole of magnet 12 a wire extends to a contact 4 opposed by a co-acting contact 3. This pair of contacts represents the co-acting fundamental contacts of a multi-pointed relay of the operating circuit, as clearly set forth in my aforesaid companion application tion Serial No. 472,969. From said contact 3 current flows to the negative pole of generator 40 by wire 127, thus completing the circuit.

As the brush-carrying bar 120 passes upwardly through the action of pedal-shoe 109 shown in Fig. 10, one of the longer fingers of brush 110 will be safely on conducting section 124$^c$ in the thirteenth horizontal row of the left-hand segment before the shorter finger of brush 110$^a$ leaves conducting section 124$^a$ in the fourteenth horizontal row of the right-hand segment. While both of these last-named fingers are still on said conducting sections, the brush 115 will come into contact with the lower edge of its associated conducting section 124$^b$ in horizontal row thirteen, at which time current will immediately flow from the negative pole of generator 40 by wires 127 and 163 to one pole of magnet 164 and from the other pole of said magnet by wire 113 to the brush 115 now resting on conducting section 124$^b$; thence upwardly through the vertical strip and by wires 122 and 121 to the positive pole of generator 40, which completes the circuit and energizes magnet 164 which attracts leftwardly the swinging member of the multi-pointed two-way switch and brings the contacts 162, 162$^a$, etc. on the movable member into touch with all the contacts 165, 165$^a$, etc. Under this condition current flows from the negative pole of generator 40 by wire 127 to contact 162 and across to its co-acting contact 165 against which it is pressed; thence by wire 111 to brush 110 now in contact with conducting section 124$^c$. Current now flows to the upper end of this strip, marked 2X, and thence by wire 167 to stationary contact 165$^b$ and across to 162$^b$ pressed against it; thence by wire 135 to one pole of magnet 55$^b$ and from the other pole of said magnet by wire 121 back to the plus pole of generator 40. The circuit in magnet 55$^b$, being thus completed, the rocking member 108 is drawn over, and the resistance 2X is cut out as described in connection with resistance 1X. Under this arrangement resistances 8X, 4X and 1X are left in the line, and the magnets 12 caused to act with a strength two steps away from their weakest power.

It is to be borne in mind that as the member 120 passes upward or downward current is never cut off from the multi-fingered brush 110 or 110$^a$ in electrical contact with any of its associated vertical strips, until the other multi-fingered brush is safely upon the next operating conducting section of one of its associated vertical strips. This shifting of current from brush to brush and therefore from segment to segment, is instantly accomplished by the movement of brush 115 (shown in Fig. 9 as just having left the upper edge of conducting section 124$^d$) so that the condition of transition of the rocking member of the multi-pointed double-throw switch, which is illustrated in order to make its action clearer, is so instantaneous as to be utterly imperceptible in its effects. It will further be observed that this multi-pointed double-throw switch serves at all times to keep the left-hand segment and the right-hand segment, traversed respectively by brushes 110 and 110$^a$, electrically separated from each other. Were this not so, "sneak" circuits would develop and prevent the perfect action of the mechanism.

It frequently happens that full power is wanted for crash and other effects more quickly than the pedal-shoe 109 can easily be moved from, say, its lowest to its highest position, for which reason a short-circuiting or bridging member 138 is provided, adapted to co-act with members 139 forming terminal contacts of the four conductors 140, 141, 142 and 143 respectively, so that when the pedal-rod 144 swings the crank-arm 145, pivoted in bearings 146, downwardly, the member 138 bridges all of the terminal contacts 139 and energizes all of the magnets 55$^a$, 55$^b$, 55$^c$ and 55$^d$, the circuit being as follows: From the negative pole of current source 40 by a wire 127 to wire 127$^a$, wire 147, bearing 146, shaft 148, contact or bridging member 138, co-acting contacts 139, and wires 140, 141, 142 and 143 to wires 129, 135, 136 and 149 respectively. The current then passes by these wires to magnets 55$^a$, 55$^b$, 55$^c$, 55$^d$, respectively, from the other poles of which wires lead to a wire 121 and by that wire back to the positive pole of source 40, thus completing the circuit and shunting out all of the normally inserted resistances. The rod 144 or its equivalent need not necessarily be attached to a pedal, but may, where conditions so dictate, be operated by any suitable means as, for instance, by a knee-swell, (not shown).

As seen in Fig. 10 the pedal-shoe 109 swings upon a rod 151 which may be fast in a bearing 152. An arm 153 moving with the pedal-shoe carries the brush holder 120 and all the brushes adapted to sweep over the conducting and non-conducting sections 123, 124 of a segment 133, only the brush 115 being shown in Fig. 10. A tube 154 contains the wires 111, 113 and 114 leading from near the center of motion of pedal-shoe 109 to the vicinity of brush 115 at the end of arm 153, the ends of these wires being connected with the switch mechanism already described (see Fig. 9). The conduit 154 is flexible and is anchored, as at 155, to the pedal 109, so as to have as little movement as possible when the pedal is operated during playing of the instrument. The segmental member 133 over which brush 115 slides is shown in Fig. 10 as a non-conducting segment shod with a dentated conducting strip filled with an insulating material to form the non-conducting sections, although it may be constructed in other ways if desired. The same method may, where it is desirable, be applied to the segments traversed by the multi-fingered brushes 110 and 110$^a$ of Fig. 9. However, in order to have the same "feel" as the multi-fingered brushes are moved up and down, it is preferred to have them ride on metal practically throughout, insulating the sections thereof, and only wiring to those which are intended to be electrically alive.

The advantages of the system shown in Figs. 9 and 10 will be readily apparent. The pedal action is smooth; it is impossible to stop the brushes either on the wrong sections or upon the insulation between sections; and the action of the whole system is such that a large number of correctly proportioned increments or decrements of resistance, and consequently a large number of intensities of speech of the corresponding speaking magnet may be conveniently, easily, and cheaply secured with the minimum number of rockers 108, thus overcoming all the disadvantages noted with respect to the embodiment of Figs. 11 and 12 and set forth in the description of said figures. By the use of four rockers shown in Fig. 9, fifteen gradations besides the full intensity may be produced, or sixteen intensities in all, and by the use of five rockers, thirty-one graded steps besides the full power may be produced, whereas by the system shown in Fig. 13, where only one rocker is supposed to be operated at a time, seven rockers yield but seven gradations besides the full power. With the system of Fig. 9, seven rockers would yield more than fifteen times that number of gradations, which clearly shows the great advantage of the method and mechanism herein set forth as embodying my present invention.

Fig. 14 shows the same general permuting rocker plan exhibited in Fig. 9 as an expression control, here used to control the speaking of the sonorous members for the purpose of securing the proper relative intensities of the partials selected to produce a tone of given timbre. It will be noted that in Fig. 9 there are four rockers 108 each operated by a magnet 55, each of said rockers commonly carrying forty-two fingers co-acting with forty-two oppositely placed fingers, while in Fig. 14 there are five rockers 108 each operated by a magnet 55 for the same permuting range. The reason for this will be obvious when it is realized that the expression control will always have, when in operation, current flowing through some one of its rockers whenever a note is sounded, while in the case of the partial-control systems, there will be many occasions when a given partial will not be present in any of its possible strengths. To make it possible to stop out entirely any partial until the same be wanted in some strength or other, a magnet such as 55ᵉ of Fig. 14 is used to operate a cut-out switch commonly of forty-two pairs of contacts, there being one of these cut-out switches for each partial and for the sub. The magnets 55ᵉ are energized when the set-up wires 49' (indicated by the solid black disks in Fig. 14), are lowered so as to be contacted by the co-acting rocker bars when said bars are actuated by the tappets indicated diagrammatically at 172, 173, 174 and 175.

The rockers 108 and their connections have been fully described in connection with Fig. 9, but in Fig. 14 the rocker 108' with its contacts and the co-acting contacts 125', has the function of a multi-pointed cut-out switch, the office of which is to open-circuit the lines 170' and 131 at all times save when some one of the set-up wires 49' is dropped into its lower position and is contacted by the rising of some bar 50 (see Fig. 5). In this way the wire 156' forming one of the leads to the magnet 55ᵉ is supplied with current, completing the circuit of said magnet through its coil and the wire 157 to the plus pole of generator 40, and causing said magnet to attract the rocker 108', bringing the contacts carried by said rocker into touch with the co-acting points 125'. Under these circumstances, if none of the four magnets 55ᵃ, 55ᵇ, 55ᶜ, 55ᵈ, be energized, the system shown, representing one partial or, in this particular case, a "sub" used as if it were a partial, will throughout one manual of the instrument, have a resistance diagrammatically represented by the sum of 1X, 2X, 4X and 8X, or 15X. Until magnet 55ᵉ is energized, however, the "sub" used as a partial, functioning normally through the system shown in Fig. 14, will not be in use in any degree.

28 indicates the bridging contact (see also Fig. 5) which upon depression of the key of the manual to which it is attached (see 23 of Fig. 5), contacts with the wire tongues 29 from the right-hand one of which wire 35 leads to one pole of magnet 36, the other pole of which is joined to wire 159 leading to the minus side of generator 40. When magnet 36 is energized upon the depression of the key associated therewith, it attracts the multi-pointed rocker 158 and brings the fingers 3, 4 into contact. This furnishes a line from the negative pole of generator 40 via wire 57, contacts 3, 4 and wire 56 to the magnet 12'.

As stated, the assembly shown in Fig. 14 pertains to the "sub", and if this "sub" has been put into use by the operation of a tappet for that purpose, the magnet 55ᵉ will be energized, and through its attraction the contacts carried by rocker 108' will be pressed against the contact fingers 125', thus completing a circuit (if magnets 55ᵃ, 55ᵇ, 55ᶜ, and 55ᵈ are de-energized), through resistances 1X, 2X, 4X and 8X to wire 170', and by wires 157' and 157 to the positive pole of source 40.

The set-up rockers are shown from the rear in Fig. 14, whereas in Fig. 5 they are shown from the front, this rear view showing the parallel vertical wiring connecting similar tongues of the various stacked set-up rockers. It will also be noted that every fifth tongue or wire 49', counting from right to left, is shown blackened in Fig. 14 but not in Fig. 5. This is because Fig. 14 shows a typical partial-mixing system provided with a magnet 55ᵉ operated through current furnished by wire 49' so that when magnet 55ᵉ is energized the system shall be operative but at all other times inoperative. It will be readily seen that without this cut-out switch some strength of this "sub" would always be heard upon the pressure of the keys of the playing manual, and the same, of course, applies to the partials which are treated like the "sub" here shown. The contact bars 50 (see Fig. 7) when they rise to their uppermost position, are put into circuit with generator 40 through coming into contact with wires 60 joined by a wire 61, which in turn is joined to wire 157 running to the positive pole of generator 40. It is to be borne in mind that there are commonly forty-two pairs of contacts 125, 125' co-acting with the contacts carried by the rockers 108, 108', for an instrument having a range of eighty-four notes, though there might be either more or less than forty-two pairs of said contacts.

This construction, together with the relay connections and general electrical disposition of the various members of a full instrument, is clearly set forth in principle in my aforesaid application, Serial No. 472,969, and accordingly will not be explained in detail herein.

The operation of the magnets shown in line above magnet 55ᵉ is in each case in principle like that for magnet 55ᵉ. For example, when its circuit is completed the wire 176 energizes the magnet 55ᵃ operating the partial rocker 108 of the particular partial with which said wire 176 is associated. In the present case the "sub" is so operated, being here treated, for clarity, as if it were a commonly recognized partial. These vertical parallel wires are shown broken off between the second and third rockers illustrated in Fig. 14, in order to indicate that there are normally many more of these stacked set-up rockers in a frame, there being normally one set-up rocker for each tone-color tappet of the instrument. The set-up rockers are also shown as broken open near their left ends, to avoid unnecessarily complicating the drawings. It is to be understood, however, that each rocker normally contains a separate contact tongue or wire 49 or 49' for every partial-rocker actuating magnet 55ᵃ, 55ᵇ, 55ᶜ, 55ᵈ or 55ᵉ, associated with every partial of the instrument. To illustrate:

In Fig. 14 showing the five magnets just mentioned, the wires 49, 49' of each set-up rocker associated with said magnets, and which are joined all down the lines of set-up rockers by the wires 176, 177, 178, 156 and 156′, will be energized when a bar 50 (Fig. 5) rises to give said wires current, thereby enabling them to operate their associated magnet or magnets 55ᵃ, 55ᵇ, 55ᶜ, 55ᵈ, or 55ᵉ. If magnet 55ᵉ be not actuated it will be useless, as already explained, to actuate any of the magnets vertically above it. If, however, the particular wire 49 of the uppermost set-up rocker which is joined to wire 176, have its front end nested in its lowest groove so as to be reached by its contacting bar 50 when it moves upwardly as already explained in connection with Figs. 5 and 7, the partial-rocker magnet 55ᵃ will be energized whenever the tappet associated with this upper set-up rocker is actuated at the console. The result of this, assuming of course that wire 49′ associated with the wire 156′ is also placed in operative position, will be that the resistance 1X will be shunted out of the line of speaking magnet 12′. Suppose, merely for the sake of illustration, that the system shown applied to the third partial of the instrument, and that the wires 176, 177, 178, 156 and 156′ were associated with that partial, which is one of the most important of all the partials. Then, when through the agency of wire 176, magnet 55ᵃ was energized with magnet 55ᵉ, every speaking magnet 12′ which was used to sound a third partial would have its line resistance decreased by the shunting out of its associated 1X resistance. If it is desired that this third partial shall be still stronger relative to other associated partials, then the front end of a wire 49 connected at its back with the wire 177 might be dropped into its lower groove as already explained, thus energizing magnet 55ᵇ as well as magnets 55ᵃ and 55ᵉ and shunting out the resistances corresponding to both 1X and 2X from any speaking magnets used to sound third partials. If the third partial is wanted in full strength, as it sometimes is, then all five wires 49, 49′ associated with wires 176, 177, 178, 156 and 156′ are dropped at their front ends into their lower grooves, with the result that when the upper set-up rocker is operated, or any other set-up rocker similarly conditioned as to the corresponding wires 49, 49′, all five magnets 55ᵃ, 55ᵇ, 55ᶜ, 55ᵈ and 55ᵉ are energized, and all resistance is cut out of the lines of any speaking magnets 12′ which are used to sound third partials.

Attention has been called to the fact which should always be kept in mind, that all the notes of the scale when used as partials or otherwise, may not have a resistance similar to that shown in Fig. 14, for generally speaking, the high notes require much more resistance than the low ones to produce a given diminution of their speech. Moreover, the proportions between the resistances shown may be changed as occasion requires, but that shown will ordinarily be the most ideal and will probably not be departed from except upon very special occasions. Such departure, however, is quite within the scope of this invention.

In Fig. 14 four set-up rockers are shown having associated with them four tappets of the console, these tappets, as heretofore mentioned, being diagrammatically shown as consisting of co-acting pairs of contacts 172, 173, 174 and 175. The circuits for each of said tappets, only one of which will be traced, are as follows: If the tappet represented at 172 be pressed at the console, closing its circuit, negative current will flow from source 40 via the wire 159, across the contacts 172, 172, now closed, and via wire 179 to one pole of magnet 51 of the upper set-up rocker shown. From the other pole of this magnet a wire 180 is joined to a wire 157 which runs to the positive pole of source 40. This completes the circuit, energizes said magnet 51, raises the contacting bar 50 of its associated rocker, and energizes all of the rocker magnets associated with wires 49, 49′ which happen to be in their lowermost position when their said bar rises. It will be seen that each set of five vertical wires applies to a given unit of the partial system, as indicated by the braces marked "Sub", "First partial" and "Second partial", the third partial set being incomplete and the others omitted for simplicity of showing.

The number of pipes which ordinarily would be used per manual for an instrument having six partials and "subs" is given below, the strengths thereof being represented by the number of ranks of pipes in the column at the left:

4 ranks of primes with 84 sounders each = 336 pipes
3 ranks of seconds with 72 sounders each = 216 pipes
3 ranks of thirds with 66 sounders each = 198 pipes
3 ranks of fourths with 67 sounders each = 183 pipes
3 ranks of fifths with 57 sounders each = 171 pipes
3 ranks of sixths with 54 sounders each = 162 pipes
3 ranks of "subs" with 72 sounders each = 216 pipes
Total number per manual..............1,482 pipes It is to be understood, of course, that for more elaborate instruments not only more partials would ordinarily be desired, but more gradations for each partial, the number of each being restricted somewhat in order not to complicate the drawings needlessly.

Fig. 17 illustrates a more or less conventional tappet mechanism, 59 being the tappet proper mounted to be rocked up and down through the console member 181 upon the back of which it is hung upon a center 182. The tappet is moved against a spring 183 the upper end of which is adjustably held by a screw 184 in a block 185, the spring being so positioned as to render it impossible for the tappet to remain in a mid position, thus ensuring that it shall be either fully on or fully off. A conducting finger, or short-circuiting member 66, is fast to and moved by the tappet 59 so that when said tappet is depressed, said finger 66 passes in between, and wedges apart, co-acting tongues or contacts 64, 65 (see Fig. 5) only contact 65 being seen in Fig. 17. This completes the circuit as heretofore explained.

In Fig. 18 the source of direct current, 40, is again shown, the letters $a, b, c, d, e, f, g, h, i, k, l, m, n, o, p$, respectively designating the magnets of relays shown in detail in Figs. 19 and 20, and more fully described in connection therewith. These relays are actuated by the passage of the brushes 110, 110ᵃ, 115, over the pedal segments shown beneath them after a manner very similar to that described in connection with Figs. 9 and 10. In the segments shown the sections 124 are conducting and the sections 123 are non-conducting. Only the right-hand segment in this figure is integrally metallic, the other two segments having their conducting sections 124 separately connected to a non-conducting section 123.

Considering now the left-hand segment and reading downwardly, it will be noted that the conducting sections 124 are connected by wires 149 in order to one pole of magnets $b, d, f, h, k, m$ and $o$, while the conducting sections 124 of the intermediate segment are, reading downwardly, respectively connected to one pole of the magnets $a, c, e, g, i, l, n$ and $p$, from the other poles of which wires 171 and 186 lead back to the generator 40. The brushes 110, 110ᵃ and 115 are not integral in this figure, but are mounted on the insulating member 187 so that whenever brush 110, co-acting with the left-hand segment, or brush 110ª, co-acting with the intermediate segment, gives current from source 40 to any of the conducting sections 124, the associated relay magnet acts bringing its current-carrying bar 188 (see also Figs. 19 and 20), into touch with such wires 189' as are in their lowermost position, current thus being given to such permuting rocker-magnets 55ª, 55ᵇ, 55ᶜ, 55ᵈ, 55ᵉ as are associated with said wires 189'.

The relay contacts 112, 119 and 117 and their associated operating magnet 116 serve in this case to shift the current alternately from brush 110ª to brush 110, and vice versa. A wire 190 leading from the minus pole of generator 40 supplies the bars 188 with negative current. A wire 186 leads to the right-hand segment, the conducting portions of which are electrically connected, so that whenever brush 115 touches one of said conducting sections 124, the relay magnet 116 is energized and contact 119 is brought against contact 112 against the action of spring 118. This makes the brush 110ª electrically alive, the circuit being from the minus pole of generator 40 by wires 127' and 191 to contact 119; thence across to contact 112; thence by wire 111 to brush 110ª; thence by whatever conducting section 124 brush 110ª happens to be on, to its associated magnet at its upper pole as shown; thence from the other pole of such magnet to common return 171; and by wire 186 to the plus pole of generator 40. This completes the circuit and raises the bar 188 (Fig. 20) in a manner to contact all the wire tongues 189' which happen to be in their lowermost positions, thus energizing such of the rocker-magnets 55ª, 55ᵇ, 55ᶜ, 55ᵈ, 55ᵉ, as are operated by the tongues 189' which are put into circuit by the rising of the bar 188.

The circuits to the rocker-magnets will be understood by tracing one of said circuits. Let us suppose that relay magnet p, Fig. 18, is energized, raising its associated bar 188 into contact with the first and the fifth of its tongues, counting upward, the three intermediate tongues having been raised into the position of tongues 189 of Fig. 19, and the outside tongues being in the position of tongues 189' of said figure. All similar wires or tongues of the five-tongued groups capable of being brought into action are joined in common, and each set so joined is joined to one pole of a corresponding magnet of the permuting rocker system; for example, the first tongues of each of the five-tongued groups associated with the relays of Fig. 18 are joined together and to the magnet 55ª, and the fifth tongues of each of said groups (counting upward) are joined together and to the magnet 55ᵉ as shown. Such being the case, when magnet p is energized negative current flows from generator 40 by wire 127' and thence by wire 190 to bar 188; thence to the first and fifth wire tongues 189 connected respectively to the lower poles of magnets 55ª and 55ᵉ; thence from the upper poles of said magnets by a wire 121 to the plus pole of generator 40, thus completing the circuit and operating said magnets 55ª and 55ᵉ, as will readily be apparent.

It will readily be seen that by letting the appropriate wire tongues of any relay down into the position of tongues 189', Fig. 19, the action of that relay may be made to actuate any or all of the permuting rockers at will. There are times when this may be of great value. Also it is to be noted that all of the possible combinations of the rockers 108 do not have to be used unless desired; for example, Fig. 18 shows pedal segments with commutator sections providing for sixteen different gradations including the circuit without resistance, while the five permutating rockers make possible thirty-odd combinations. The purpose is to secure out of these thirty-odd possibilities the sixteen most desirable values, for it sometimes happens that the best results are not obtained by having a certain number of possibilities of increments and using them all, but by having a larger number and selecting from them the desired number of values. It will be obvious that this last-named advantage applies as well to the type shown in the other figures as to Fig. 18. All that is needed is to give the permutating system more possible combinations than the commutator system can handle, making the necessary connections, in order to choose values at will from among the extra possibilities.

In Figs. 19 and 20 a comb-like non-conducting member 192 is shown adapted to hold the wires associated therewith, five in number as shown, in either one of two positions as indicated at 189 and 189'. A magnet core 193 carries a coil 194 and to the rear of core 193 is an iron or steel member 195 carrying the armature 196 attached thereto by a leaf spring 197, and adapted, upon the energization of the magnet, to be drawn up against the iron member 198 upon the front end of the core. Armature 196 carries a member 199 to the upper end of which is secured the contact bar 188, the action of which has already been sufficiently described. This relay, though on a smaller scale, has much in common with the set-up rockers or switches of Figs. 5 and 14, and will be readily understood from their description.

I have endeavored to show the principles of my invention with as little complexity as possible, and as a result have made no attempt to go into refined structural details difficult of easy explanation, where they were not held necessary to the illustration of the essential principles of my invention. An example in point is Fig. 9 where the insulated and conducting areas traversed by the brushes are all shown of equal length for the sake of easy comprehension. In actual practice, however, where it is often desirable to have all the brushes of one size and interchangeable in their holders as shown in Fig. 18, as well as to have equal movements of the pedal shoes always cause an equal number of current increments or decrements in the magnets 12 or 12', the brush holders will commonly be made with detachable and interchangeable brushes as in said Fig. 18, the sizes of the insulated and conducting sections 123, 124 being preferably varied to favor this detail as well as attain the aforesaid results respecting equal pedal movements. Any such, or similar, changes in size, constructive details, etc., are entirely within the scope of my invention, and are to be so regarded.

There may often arise cases where the gradation of ohmic resistance by perfectly gradual increments and decrements may not mean that the tonal gradations of the sounders will follow the same curve, for which reason means have been provided for selectively choosing from a surplus of possibilities, the particular values which suit such particular cases, and it is to be understood that in this permuting system, gradations which are gradual and those which are not gradual are equally within the scope of the invention.

The invention has herein been shown as applicable to the control of the loudness of tones for purposes of synthetic production of different timbres, and also as applicable to the control of loudness of musical utterances, however simple or complex, for purposes of artistic musical expression. The invention is not, however, limited to these two uses, as there are other uses which come well within the scope thereof. Neither is the invention limited to an unequal value of the elements used in the permutation system for, while such value is ordinarily preferable and makes for smoothness of gradation, there may be cases, well within the scope of the invention, wherein a very wide range of gradation may be of more importance than the smoothness thereof.

I claim:—

1. The herein-described method of eliciting from a relatively few sound-generating elements a relatively large number of intensity gradations, which consists in producing through a permutation system, increments of intensity of unequal value in connection with each pitch; selecting at the will of the operator, any one or more of said intensity gradations; and sounding the resultant tones with the intensities so selected.

2. The herein-described method of controlling the loudnesses of the tones produced by the sounders of a musical instrument, which consists in producing through a permutation system a plurality of intensity increments of unequal value to be associated with each pitch of the instrument, and sounding the desired tones in any one or more of such intensities, at the will of the operator.

3. The herein-described method of controlling the speech of the tones produced by the sounders of a musical instrument, which consists in producing through a permutation system a plurality of intensity increments to be associated with each pitch of the instrument; and sounding the desired tones in any one or more of such intensities, at the will of the operator.

4. The method of producing tones of different qualities which consists in producing in a plurality of different intensities and approximately sine-wave form, each pitch of a musical scale to be used as partials; selecting at will and in proper relative strengths the partials for each composite quality desired; and sounding said partials so that they mix in the air as a tone of the predetermined timbre, the different intensities being produced by a permutation system whereby the player may at will select in connection with any pitch, any one of the plurality of intensities of which it is capable, through calling into action any one or more of the elements of the system controlling the intensities of that pitch.

5. The method of producing tones of different qualities, which consists in producing in a plurality of different intensities and approximately sine-wave form, each pitch of a musical scale to be used as partials; selecting at will and in proper relative strengths the partials for each composite quality desired and sounding said partials so that they mix in the air as a tone of the predetermined timbre desired; and grading the tones so produced for purposes of artistic musical expression through a permutation system instantly capable, at the will of the operator, of producing a relatively large number of intensity or loudness gradations from a comparatively few elements.

6. The method of producing tones of different qualities which consists in producing in a plurality of different intensities and approximately sine-wave form, each pitch of a musical scale to be used as partials; selecting at will and in proper relative strengths the partials for each composite quality desired, and sounding said partials so that they mix in the air as a tone of the predetermined timbre, the different intensities being produced by a permutation system whereby the player may at will select in connection with any pitch, any one of the plurality of intensities of which it is capable, through calling into action any one or more of the elements of the system controlling the intensities of that pitch; and instantly varying, at the will of the player, the loudness of all of the vibrations simultaneously produced without altering their relative loudnesses or the quality or qualities of the composite tone or tones simultaneously elicited.

7. The herein described method of selectively and synthetically producing any of a series of tones in musical relation and of predetermined quality or timbre, which consists in simultaneously producing air vibrations of the frequencies to produce the selected fundamentals or first partials, and other air vibrations of frequencies and intensities to produce in proper strength any desired partials to be associated with such fundamentals or first partials; and permitting the different sets of vibrations to mingle in the air, the said intensities being regulated by a permutation system capable of calling into action, in the case of any pitch, any one or more of the elements of the system associated with such pitch.

8. The herein described method of selectivity and synthetically producing any of a series of tones in musical relation and of predetermined quality or timbre, which consists in simultaneously producing air vibrations of the frequencies to produce the selected fundamentals or first partials, and other air vibrations of frequencies and intensities to produce in proper strength any desired partials to be associated with such fundamentals or first partials; permitting the different sets of vibrations to mingle in the air, the said intensities being regulated by a permutation system capable of calling into action, in the case of any pitch, any one or more of the elements of the system associated with such pitch; and through another permutation system permitting the player, at will, instantly to vary for purposes of artistic expression the loudness or loudnesses of all said vibrations without altering their relative loudnesses or the quality of the composite tone or tones produced.

9. In a musical instrument, in combination, a plurality of wind-actuated pipes for a single pitch; and a permutation system operable, at the will of the player, to sound any one or more of the said pipes of like pitch, singly or in any desired combination and intensity.

10. In a musical instrument, in combination, a plurality of wind-actuated pipes for a single pitch, voiced at a plurality of intensities of speech; and a permutation system operable at the will of the player, to sound any one or more of the said pipes of like pitch, singly or in any desired combination and intensity.

11. In a musical instrument, in combination, a plurality of wind-actuated pipes for a single pitch; a permutation system operable at the will of the player to sound, upon the depression of an associated key, any one or more of the said pipes of like pitch, singly or in any desired combination; and means, also controllable by the player, for modulating for purposes of expression the effective audible intensity of the speech of the pipes so sounded.

12. In a musical instrument, in combination, a plurality of wind-actuated sounders for each pitch of the instrument's gamut; a permutation system operable at the will of the player to sound, upon the depression of a key of the manual or its equivalent, any one or more of said sounders associated therewith in the relation of fundamental and any one or more of said sounders in any group or groups thereof associated with said key in the relation of upper partials of its fundamental or prime tone, said permutation system including means for selecting, combining and regulating the strengths of the chosen partials and thus determining the timbre of the composite tone; and means, controllable by the player, for modulating for purposes of musical expression, the effective audible intensity of the speech of the pipes so sounded.

13. In a musical instrument, in combination, the herein-described permutation system, said system including a plurality of elements of unequal value for each associated pitch; and means, operable at the will of the player, for bringing into action in connection with any pitch, any one or more of the said elements associated therewith.

14. In a musical instrument, in combination, a plurality of wind-actuated sounders for a single pitch voiced at a plurality of intensities of speech; a permutation system operable at the will of the player to sound, upon the depression of an associated key, any one or more of said associated sounders, singly or in any desired combination; and means, also controllable by the player, for modulating for purposes of musical expression, the effective audible intensity of the speech of said pipes simultaneously sounded.

15. In a musical instrument, in combination, segments bearing conducting and non-conducting sections; a plurality of brushes traversing said sections; a source of current; electrical connections between said source of current and said brushes; and means for passing current through one or the other of said brushes at will, to the selected conducting section or sections of said segments.

16. In a musical instrument, a permutation system including, in combination, segments bearing conducting and non-conducting sections; a plurality of brushes traversing said sections; a source of current; electrical connections between said source of current and said brushes; means for passing current through one or the other of said brushes at will, to a selected conducting section or sections of said segments; and means controllable by the player for modulating the effective audible intensity of the tones produced.

17. In a musical instrument, in combination, a set of sonorous bodies capable of producing simple sine-wave tones; means for selecting and combining such simple tones to produce any desired timbre or tonal color, said means comprising a series of rockers, a plurality of series of wire tongues adapted to be put into operative or inoperative position relative to the movement of said rockers, a series of contact fingers, and magnets for controlling the closing of said contact fingers and the operation of said rockers; a source of current; means for closing the circuits of the magnets controlling the sounders which produce the partials of the desired composite tone; and means for securing the proper relative intensities of the selected partials.

MELVIN L. SEVERY.